United States Patent [19]

Dué et al.

[11] Patent Number: 6,060,537
[45] Date of Patent: May 9, 2000

[54] WATER BASED INK JET PRINTING INK

[75] Inventors: George B. Dué; John W. Standard, both of Pittsburgh; Michael E. OBrien, Greensburg, all of Pa.

[73] Assignee: Matthews International Corporation, Pittsburgh, Pa.

[21] Appl. No.: 09/217,508

[22] Filed: Dec. 21, 1998

Related U.S. Application Data

[62] Division of application No. 08/571,072, Dec. 12, 1995, abandoned.

[51] Int. Cl.<sup>7</sup> ..................................................... C09D 11/10
[52] U.S. Cl. .......................... 523/161; 524/522; 524/523; 260/DIG. 38; 106/31.13
[58] Field of Search .................... 523/161; 260/DIG. 38; 524/522, 523; 206/31.13

[56] References Cited

U.S. PATENT DOCUMENTS

| | | | |
|---|---|---|---|
| 4,940,628 | 7/1990 | Lin et al. | 428/207 |
| 5,316,575 | 5/1994 | Lent et al. | 106/20 R |
| 5,594,044 | 1/1997 | Yang | 523/160 |

*Primary Examiner*—Terrel Morris
*Assistant Examiner*—John J. Guarriello
*Attorney, Agent, or Firm*—Reed Smith Shaw & McClay LLP

[57] ABSTRACT

A water based ink composition which can be used effectively in various ink jet type printing arrangements and on a variety of predetermined substrate surfaces. Such ink composition being resistant to smearing and running when contacted by water after application and drying on such substrate surfaces. This water based ink composition comprising a dye material, having a predetermined color, which is present in the ink composition generally in a range of between about 0.1 weight percent and about 10.0 weight percent. Water is present in such ink composition generally in a range of between about 50.0 weight percent and about 80.0 weight percent. There is a substantially water compatible organic solvent compound for dissolving such dye material therein. The organic solvent compound is present in such ink composition generally in a range of between about 10.0 weight percent and about 40.0 weight percent. Such ink composition exhibits a surface tension generally in a range of between about 20 dynes and about 50 dynes and a viscosity in a range of between about 1 centipoise and about 50 centipoise.

11 Claims, No Drawings

WATER BASED INK JET PRINTING INK

CROSS-REFERENCE TO RELATED APPLICATIONS

This application is a Divisional application of patent application Ser. No. 08/571,072, filed Dec. 12, 1995, now abandoned.

FIELD OF THE INVENTION

The present invention relates, in particular, to various types of ink formulations which are normally utilized in modern ink jet type printing arrangements for a relatively large number of printing applications and, still more particularly, this invention relates to a new and improved substantially water based type ink formulation for utilization in such ink jet printing arrangements which after both an application to and being allowed to substantially dry on at least one exposed surface of a predetermined substrate will be essentially resistant to both smearing and running when such ink formulation comes into intimate contact with water.

BACKGROUND OF THE INVENTION

Prior to both the conception and subsequent development of the present invention, as is generally well recognized in the relevant printing ink formulation art, the various ink compositions that were being used rather extensively in ink jet type printing arrangements have normally all been manufactured with either water or a number of other chemical compounds being utilized as a solvent and/or carrier material for the ink dye. These prior art type printing ink compositions, however, are all known to exhibit a number of significant disadvantages in their use.

For example, certain known chemical solvent compounds that are presently being used in these particular ink formulations present a number of undesirable environmental problems. Such environmental problems, as would generally be expected by persons skilled in the art, can be encountered by both the manufacturer of the ink formulations as well as the end user of such inks. Additionally, these prior art chemical solvents, which are being rather extensively used at the present time, are relatively expensive and therefore add significantly to the cost of these inks.

On the other hand, when water has been used as the solvent and/or carrier material for the ink dye in these ink formulations it is generally well recognized in the art that the ink will have a tendency to smear and/or run if it comes into intimate contact with water. This will even be the case, for example, when such ink has been allowed to become substantially dry on the surface of the substrate to which it has been applied. Such smearing and/or running of the ink cannot normally be tolerated in most printing applications. The reason for this is that in these prior art water based ink formulations the ink will remain water soluble even after such drying has taken place.

Consequently, most of the ink formulations, which are known by the applicants to be in use in ink jet printing applications at the present time, normally require the use of the considerably more expensive and environmentally undesirable chemical solvent based ink.

SUMMARY OF THE INVENTION

According to a first embodiment, the present invention provides an improved water based ink composition which can be used effectively in various ink jet type printing arrangements. In addition, this ink composition can be used on a variety of predetermined porous type substrate surfaces. Such water based ink composition is substantially resistant to smearing and/or running when it comes into contact with water after it has been applied to and dried on these porous type substrate surfaces. This water based ink composition includes a preselected dye material having a predetermined color. The preselected dye material being present in such water based ink composition generally in the range of between about 0.1 weight percent and about 10.0 weight percent. Water is present in this water based ink composition generally in the range of between about 50.0 weight percent and about 80.0 weight percent. The ink composition also includes a substantially water compatible organic solvent compound in which such preselected dye material is dissolved. Such substantially water compatible organic solvent compound is present in this water based ink composition generally in the range of between about 10.0 weight percent and about 40.0 weight percent. The water based ink composition, of this invention, exhibiting a predetermined surface tension. Such predetermined surface tension generally being in the range of between about 20 dynes and about 50 dynes. Additionally, this water based ink composition will have a predetermined viscosity which is generally in the range of between about 1 centipoise and about 50 centipoise.

In an alternative second embodiment, the present invention provides a new and improved water based ink composition which can likewise be used effectively in various ink jet type printing arrangements. In this particular alternative embodiment such ink composition can be used on a variety of predetermined nonporous type substrate surfaces. This water based ink composition also being resistant to smearing and/or running when contacted by water or other liquid media after it has been applied to and dried on such nonporous type substrate surfaces. This water based ink composition includes a preselected dye material having a predetermined color. Such preselected dye material being present in this embodiment of the water based ink composition generally in the range of between about 0.1 weight percent and about 10.0 weight percent. Water is present in this embodiment of such water based ink composition generally in the range of between about 50.0 weight percent and about 70.0 weight percent. There is a substantially water compatible organic solvent compound provided for dissolving such preselected dye material therein. This substantially water compatible organic solvent compound is present in this embodiment of such water based ink composition generally in the range of between about 10.0 weight percent and about 30.0 weight percent. Additionally, there is a film forming polymer resin provided. Such film forming polymer resin being present in such water based ink composition generally in the range of between about 10.0 weight percent and about 30.0 weight percent. Also required in this embodiment of the invention is a neutralizing agent. Such neutralizing agent being present in this particular water based ink composition generally in the range of between about 0.1 weight percent and about 5.0 weight percent. Like the first embodiment, this alternative embodiment of the water based ink composition also exhibits a predetermined surface tension which will generally be in the range of between about 20 dynes and about 50 dynes and this embodiment of such water based ink composition will have a predetermined viscosity generally in the range of between about 1 centipoise and about 50 centipoise.

OBJECTS OF THE INVENTION

It is, therefore, one of the primary objects of the present invention to provide a water based type ink formulation for use in ink jet type printing arrangements for a number of different applications on the surface of various types of substrates which is both environmentally desirable and safe to use.

Another object of the present invention is to provide a water based type ink formulation for use in ink jet type printing arrangements for a number of different applications on the surfaces of various types of substrates which when exposed to water after an application to and subsequent drying on the surface of a predetermined substrate will normally not smear and/or run.

Still another object of the present invention is to provide a water based type ink formulation for use in ink jet type printing arrangements for a number of different applications on the surface of various types of substrates which is relatively inexpensive to manufacture.

Yet another object of the present invention is to provide a water based type ink formulation for use in ink jet type printing arrangements for a number of different applications on the surface of various types of substrates which formulation can be produced from readily available compounds.

A further object of the present invention is to provide a water based type ink formulation for use in ink jet type printing arrangements which ink formulation can be easily modified for a variety of end applications.

Still yet another object of the present invention is to provide a water based type ink formulation for use in ink jet type printing arrangements which ink formulation can be rather easily modified for application to either a rather porous or substantially nonporous substrate surface.

It is an additional object of the present invention to provide a water based type ink formulation for use in ink jet type printing arrangements which will not require modifications to existing ink jet type printing equipment.

Yet still another object of the present invention is to provide a water based type ink formulation for use in ink jet type printing arrangements for a number of different applications on the surface of various types of substrates which can easily be formulated with different colors if desired.

In addition to the number of objects and advantages of the present invention which have been discussed above, it should be noted that various other objects and advantages of the water based ink formulation for use in an ink jet printing arrangement for a variety of applications will become more readily apparent to those persons who are particularly skilled in the ink formulation art from the following more detailed description of such invention.

BRIEF DESCRIPTION OF THE PRESENTLY PREFERRED AND VARIOUS ALTERNATIVE EMBODIMENTS OF THE INVENTION

According to the instant invention, the improved water based type ink composition can be used with great effectiveness in various existing ink jet type printing arrangements. As by way of example, the invented ink formulation can be used effectively on the surface of a variety of predetermined porous type substrates. These porous type surfaces at least include, but are not to be limited thereto, corrugated board, gypsum board and paper.

The water based type ink composition of this invention will be substantially resistant to both smearing and running when it is contacted by water and/or any other liquid media after an application to and the subsequent drying on such surface of a porous type substrate.

Such water based type ink composition includes a preselected dye material having a predetermined color. This preselected dye material will be present in such water based type ink composition generally in the range of between about 0.1 weight percent and about 10.0 weight percent.

In the presently preferred embodiment of the water based type ink composition this preselected dye material will be a commercially available azine dye. Additionally, in this particular embodiment, such predetermined color will be selected from the group consisting of black, magenta, yellow, cyan and various mixtures thereof. The most preferred predetermined color will, however, be black for most of the applications that are presently envisioned for rather extensive use of this ink composition.

Such preselected dye is present in such water based type ink composition, in a presently preferred embodiment, generally in the range of between about 0.5 weight percent and about 7.0 weight percent. In the most preferred embodiment of the invention such preselected dye will be present in the water based type ink composition generally in the range of between about 1.0 weight percent and about 5.0 weight percent.

The major component of the water based type ink composition is water. Such water is present in the water based type ink composition generally in the range of between about 50.0 weight percent and about 80.0 weight percent.

Preferably, such water will be present in such water based type ink composition generally in the range of between about 65.0 weight percent and about 80.0 weight percent and still more preferably such water will be present in this water based type ink composition generally in the range of between about 70.0 weight percent and about 80.0 weight percent.

The final essential element of the water based type ink composition, in this embodiment of the present invention, is a substantially water compatible organic solvent compound. Such organic solvent compound is used in this ink formulation to substantially dissolve such preselected dye material. This substantially water compatible organic solvent compound is present in such water based type ink composition generally in the range of between about 10.0 weight percent and about 40.0 weight percent.

In a presently preferred embodiment of this first aspect of the invention, such substantially water compatible organic solvent compound will be present in such water based type ink composition generally in the range of between about 10.0 weight percent and about 30.0 weight percent. Additionally, in the most preferred embodiment of the instant invention, such substantially water compatible organic solvent compound will be present in such water based type ink composition generally in the range of between about 10.0 weight percent and about 20.0 weight percent.

According to the present invention, when it is desirable for such water based type ink composition to exhibit a relatively low flash point, then such substantially water compatible organic solvent compound will preferably be a low molecular weight alcohol. On the other hand, according to the present invention, when it is desirable for such water based type ink composition to exhibit a relatively high flash point, then such substantially water compatible organic solvent compound will preferably be a glycol either.

It should also be noted that such water based type ink composition of the present invention will preferably exhibit a predetermined surface tension. This predetermined surface tension will generally be in the range of between about 20 dynes and about 50 dynes which will allow the ink composition to properly wet out the surface of the predetermined substrate being marked. In the presently preferred embodiment such surface tension will generally be in the range of between about 25 dynes and about 35 dynes.

In addition such water based type ink composition will have a predetermined viscosity. Such predetermined viscosity will be generally in the range of between about 1 centipoise and about 50 centipoise which will enable such water based type ink composition to work properly in most of the known ink jet type printers. Preferably, such viscosity will generally be in the range of between about 5 centipoise and about 20 centipoise.

According to an alternative second embodiment of the instant invention, there is provided a new and improved water based type ink composition which can be used effectively in various ink jet type printing arrangements and on the surface of a variety of predetermined nonporous type substrates. This particular water based type ink composition also being resistant to smearing and running when it is contacted by water and/or other liquid media after it has been applied to and dried on such nonporous type substrate surfaces.

In this alternative embodiment, such water based type ink composition also includes a preselected dye material having a predetermined color. As in the first embodiment such preselected dye material will be present in the water based type ink composition generally in the range of between about 0.1 weight percent and about 10.0 weight percent.

In this alternative embodiment of the water based type ink composition it is presently preferred that this preselected dye material will likewise be an azine dye. Additionally, in this alternative embodiment such predetermined color will also be selected from the group consisting of black, magenta, yellow, cyan and various mixtures thereof. The most preferred predetermined color will be black, however, for most of the applications envisioned for rather extensive use of this alternative ink composition.

Further, in this alternative embodiment, such preselected dye will preferably be present in such water based type ink composition generally in the range of between about 0.5 weight percent and about 7.0 weight percent. In the most preferred alternative embodiment of the invention such preselected dye will be present in the water based type ink composition generally in the range of between about 1.0 weight percent and about 5.0 weight percent.

As in the first embodiment, water is an essential component in the alternative embodiment of such water based type ink composition. In this alternative embodiment such water will be present generally in the range of between about 50.0 weight percent and about 70.0 weight percent.

In a presently preferred embodiment of such alternative water based type ink composition such water will be present generally in the range of between about 50.0 weight percent and about 65.0 weight percent. In the more preferred alternative embodiment of such water based type ink composition such water will be present generally in the range of between about 50.0 weight percent and about 60.0 weight percent.

Another essential component of this alternative embodiment of the water based type ink composition is a substantially water compatible organic solvent compound. Such water compatible organic solvent compound is provided to enable dissolving such preselected dye material therein. Such substantially water compatible organic solvent compound will be present in this alternative embodiment of such water based type ink composition generally in the range of between about 10.0 weight percent and about 30.0 weight percent.

It is presently preferred that such substantially water compatible organic solvent compound be present in such alternative embodiment of such water based type ink composition generally in the range of between about 10.0 weight percent and about 25.0 weight percent. It is most preferred that such substantially water compatible organic solvent compound be present in this alternative embodiment of such water based type ink composition generally in the range of between about 15.0 weight percent and about 25.0 weight percent.

Another essential component of this alternative embodiment for such water based type ink composition is a film forming polymer resin. This film forming polymer resin will be present in such alternative embodiment of such water based type ink composition generally in the range of between about 10.0 weight percent and about 30.0 weight percent.

In the presently preferred alternative embodiment of the water based type ink composition of this invention, such film forming polymer resin will be selected from the group consisting of acrylics, polyesters, epoxies, vinyls and various mixtures thereof. It should be noted here, however, that it is critical that whatever resin is selected it must at least be capable of being made miscible in water.

Additionally, in this embodiment such film forming polymer resin is, preferably, present in such water based type ink composition generally in the range of between about 15.0 weight percent and about 30.0 weight percent and in the most preferred alternative embodiment of such water based type ink composition such film forming polymer resin is present generally in the range of between about 20.0 weight percent and about 30.0 weight percent.

The final component of this alternative embodiment of such water based type ink composition is a neutralizing agent. Such neutralizing agent will be present in the water based type ink composition generally in the range of between about 0.1 weight percent and about 5.0 weight percent;

In a more preferred embodiment of such water based type ink composition, such neutralizing agent will be present generally in the range of between about 0.5 weight percent and about 4.0 weight percent and in the most preferred embodiment such neutralizing agent will present in such water based type ink composition generally in the range of between about 1.0 weight percent and about 3.0 weight percent.

As with the first embodiment of the invention, this alternative embodiment of such water based type ink composition will exhibit a predetermined surface tension which will generally be in the range of between about 20 dynes and about 50 dynes and such alternative embodiment of such water based type ink composition will have a predetermined viscosity will generally be in the range of between about 1 centipoise and about 50 centipoise.

It has been discovered that by using a special type of preparation chemistry an ink jet type printer ink composition can be manufactured which contains at least about 50 weight percent water while simultaneously providing final properties that are at least equivalent to the properties achieved by the chemical solvent based ink jet type printer ink compositions used heretofore. In fact, testing has demonstrated that these water based type ink compositions of the present invention exhibit superior water resistance when compared to the chemical solvent based type ink jet printer ink compositions.

Further, it is important to note that it is the combination of preparation and chemistry which have enabled this superior ink composition to be achieved. Because the predetermined dye being used in the presently preferred embodiments of the invention is not miscible in water the preparation of the ink composition must be carried out in a specific sequence. In other words, the dye must be dissolved in the organic solvent compound before it is added to the water component of the ink composition.

In addition, in the embodiment of the present invention which requires the use of resins, such resins must be neutralized to a pH of greater than about 7 before they are added to the water mixture.

Tests have been conducted that have demonstrated that in each of the ink compositions of the present invention if the level of the predetermined dye is below about 0.1 weight percent the resulting ink composition will not contain enough color to contrast with the surface of the predetermined substrate. On the other hand, if the level of the predetermined dye present is above about 10.0 weight percent the resulting ink composition will exhibit a viscosity that is to high to print in normal ink jet type printers presently in use. In addition, the cost of using a dye level above this amount would not be cost effective or warranted.

Note should be taken, also that in each of the ink compositions of the present invention if the water level present in the ink composition is below about 50 weight percent the resulting ink composition will exhibit too high a level of solvent and would therefore not be environmentally friendly. However, if the water level exceeds about 80 weight percent the resulting ink composition will not exhibit a suitable surface tension to work on porous surfaces of a substrate and will not apply correctly onto nonporous surfaces of a substrate.

Additionally, it is important to note that if the substantially water compatible organic solvent compound is below about 10 weight percent the resulting ink composition will, also, not exhibit a suitable surface tension to work on porous surfaces of a substrate and will not apply correctly onto nonporous surfaces of a substrate. On the other hand, if the substantially water compatible organic solvent compound is above about 40 weight percent the resulting ink composition will have too high a solvent level and therefore not be environmentally friendly.

In the alternative embodiment of the present invention, it has been demonstrated that if the resin present in such water based type ink composition is below about 10 weight percent the resulting ink composition will provide unsuitable film properties. However, if the resin is above about 30 weight percent the resulting ink composition will have too high a viscosity to work in standard ink jet type printers.

Finally, in this alternative embodiment, it has been determined that if the neutralizing agent is below about 0.1 weight percent the resin will not be miscible in water and the resin will separate. Conversely, if the neutralizing agent is above about 5.0 weight percent the final mark on the product would not exhibit satisfactory water resistance.

It should be evident from the above description that a water based type ink composition has been developed that is both water based and when printed onto a surface of a predetermined substrate the resulting print is water resistant. This provides the end user of such water based type ink composition to mark his product with the knowledge that the mark will remain legible even if such product should inadvertently come into contact with water and/or any other liquid media.

In addition, it should be pointed out that the invented water based type ink compositions can be used effectively in ink jet printers commonly known as "Drop on Demand" as well as valve and piezo type printers. It is further anticipated that this water based type ink composition can be effectively used in printers which are known in the art as continuous and bubble type printers.

While a number of presently preferred and various alternative embodiments of the present invention have been described in detail above, various other adaptations and modifications of the water based ink formulation may be made by those persons who are skilled in the ink formulation art without departing from either the spirit of the invention or the scope of the appended claims.

We claim:

1. An improved water based ink composition which can be used effectively in various ink jet printing arrangements and on a surface of a variety of nonporous substrates, said water based ink composition being resistant to both smearing and running when contacted by liquids after application to and subsequent drying on such surface of such nonporous substrates, said water based ink composition comprising:

(a) a preselected dye material having a predetermined color, said preselected dye material being present in said water based ink composition generally in a range of between about 0.1 weight percent and about 10.0 weight percent;

(b) water present in said water based ink composition generally in a range of between about 50.0 weight percent and about 70.0 weight percent;

(c) a water compatible organic solvent compound for dissolving said preselected dye material therein, said water compatible organic solvent compound being present in said water based ink composition generally in a range of between about 10.0 weight percent and about 30.0 weight percent;

(d) a water miscible film forming polymer resin neutralized to a pH of greater than about 7, said water miscible film forming polymer resin being present in said water based ink composition generally in a range of between about 10.0 weight percent and about 30.0 weight percent;

(e) said water based ink composition exhibiting a surface tension generally in a range of between about 20 dynes and about 50 dynes; and (f) said water based ink composition having a viscosity generally in a range of between about 1 centipoise and about 50 centipoise.

2. A water based ink composition, according to claim 1, wherein said water is present in said water based ink composition generally in a range of between about 50.0 weight percent and about 65.0 weight percent.

3. A water based ink composition, according to claim 2, wherein said water is present in said water based ink composition generally in a range of between about 50.0 weight percent and about 60.0 weight percent.

4. A water based ink composition, according to claim 1, wherein said water compatible organic solvent compound is present in said water based ink composition generally in a range of between about 10.0 weight percent and about 25.0 weight percent.

5. A water based ink composition, according to claim 4, wherein said water compatible organic solvent compound is present in said water based ink composition generally in a range of between about 15.0 weight percent and about 25.0 weight percent.

6. A water based ink composition, according to claim 1, wherein said film forming polymer resin is selected from the group consisting of acrylics, polyesters, epoxies, vinyls and various mixtures thereof.

7. A water based ink composition, according to claim 6, wherein said film forming polymer resin is present in said water based ink composition generally in a range of between about 15.0 weight percent and about 30.0 weight percent.

8. A water based ink composition, according to claim 7, wherein said film forming polymer resin is present in said water based ink composition generally in a range of between about 20.0 weight percent and about 30.0 weight percent.

9. A water based ink composition, according to claim 1, wherein said water based ink composition further includes a neutralizing agent and said neutralizing agent is present in said water based ink composition generally in a range of between about 0.1 weight percent and about 5.0 weight percent.

10. A water based ink composition, according to claim 9, wherein said neutralizing agent is present in said water based ink composition generally in a range of between about 0.5 weight percent and about 4.0 weight percent.

11. A water based ink composition, according to claim 10, wherein said neutralizing agent is present in said water based ink composition generally in a range of between about 1.0 weight percent and about 3.0 weight percent.

* * * * *